No. 893,112. PATENTED JULY 14, 1908.
W. H. TEN EYCK.
CAR STAKE.
APPLICATION FILED JUNE 24, 1907.

WITNESSES
Wm. F. Drew.
F. Booth.

INVENTOR
Wm. H. Ten Eyck.
BY N. A. Acker
his ATTORNEY

UNITED STATES PATENT OFFICE.

WILLIAM H. TEN EYCK, OF OAKLAND, CALIFORNIA.

CAR-STAKE.

No. 893,112.  Specification of Letters Patent.  Patented July 14, 1908.

Application filed June 24, 1907. Serial No. 380,467.

*To all whom it may concern:*

Be it known that I, WILLIAM H. TEN EYCK, a citizen of the United States, residing at Oakland, in the county of Alameda and State of California, have invented certain new and useful Improvements in Car-Stakes, of which the following is a specification.

The invention relates to a stake with its means for attachment to vehicle bodies generally, although it is more specifically designed for use in connection with that class of vehicles known as freight cars, whether of the flat car, or the gondola type of car.

By the use of the hereinafter described invention, the stake is permanently secured to the sides of the vehicle body in such a manner that the same may be readily thrown into a vertical position to confine the load of the car, and be held locked in such position so long as the load remains on the car, the stake when released being permitted to be turned downward so as to lie alongside of the vehicle body in such a manner as to clear the floor thereof when employed in connection with a flat car.

The object of the invention is to dispense with the complicated form of locking means at present employed for the securing of the stake to the sides of the vehicle body in a vertical or upright position, thereby materially reducing the cost thereof, and to so construct the securing means that the stake may be held in locked vertical position in a manner similar to the securing of the detachable stakes to the body of a vehicle. This object is attained by pivoting the stake to the side of the vehicle in order that it may be readily thrown into an upright or vertical position, and in so constructing the same as to permit of a limited vertical movement thereof in order that it may be slipped downward when in its raised position so that the lower end thereof may be placed within a socket-plate provided to receive the same, which socket-plate is held in line with and a slight distance below the pivotal point of the stake.

To comprehend the invention reference should be had to the accompanying sheet of drawings, wherein—

Figure 1:
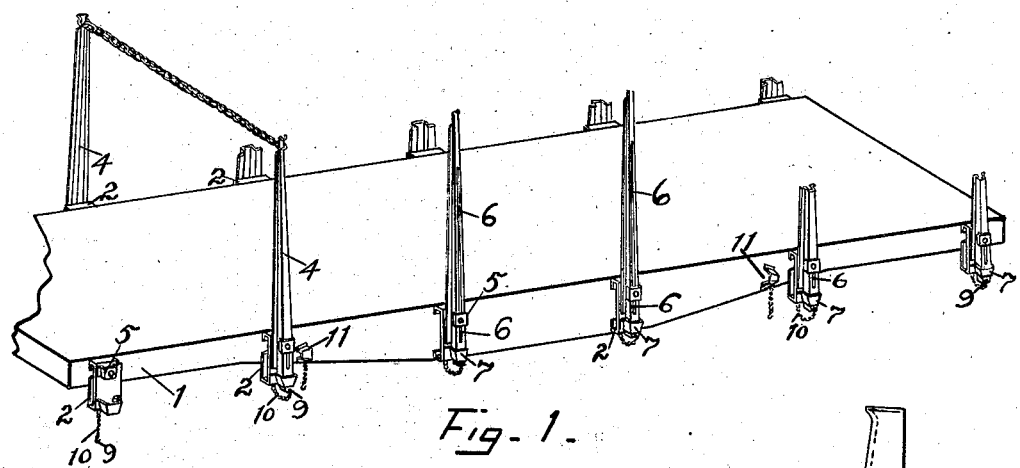
Figure 2:
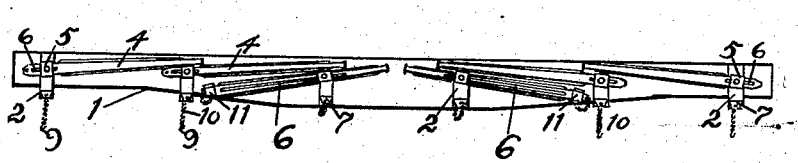
Figure 3:
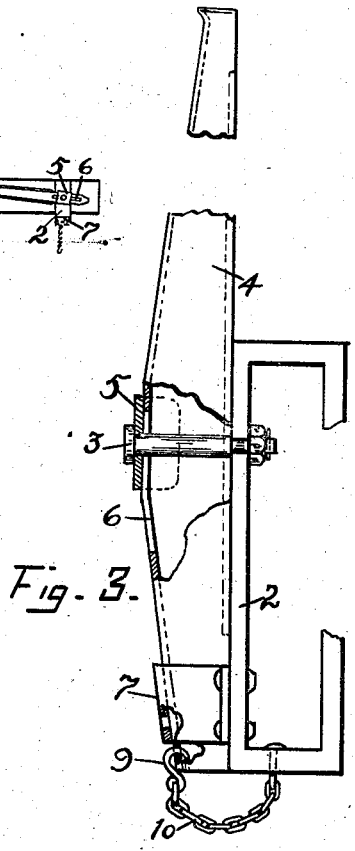
Figure 4:
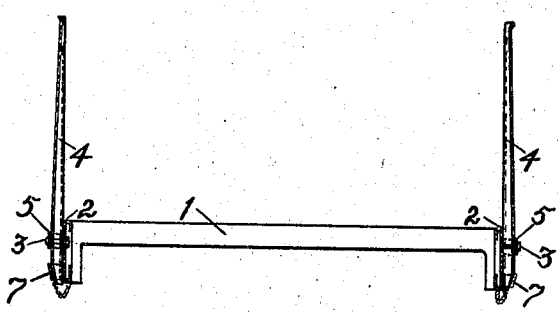

Figure 1 is a perspective view of an ordinary flat car with the stakes secured thereto, the said stakes being illustrated in raised or vertical position and fitted within the securing socket-plates; Fig. 2 is a side view of the car with the stakes shown in their lowered position; Fig. 3 is a detail view of one of the stakes removed from the car; and Fig. 4 is a cross sectional view taken on line *x x* of Fig. 1 of the drawings.

For convenience of illustration, the invention is shown as applied to an ordinary flat car, and in the drawings the numeral 1 designates the body of such a constructed car, to the sides of which are preferably secured a series of supporting brackets or plates 2. To these supporting brackets or plates are pivoted by means of the pivotal-bolts 3 the stakes 4, the said pivotal-bolts extending through the guide-sleeves 5 and the vertically slotted portion 6 of the stakes 4. The said guide-sleeves are held against vertical movement by the securing pivotal-bolts 3, although the same are free to turn with the movement of the stakes 4 as thrown into a raised and lowered position. The stakes 4 move or slip vertically within the guide-sleeves 5 through which they work, due to the vertical play permitted by the slotted portion 6 of each stake through which the pivotal-bolts extend. Preferably the stakes are formed of pressed steel, and are tapered upwardly toward the top or upper end, the shape of the stakes being that common to those employed for the desired purpose.

A slight distance below each of the pivotal-bolts 3 is located a metallic socket-plate 7, which in the present case is secured to and carried by the supporting bracket or plate 2; said socket-plate being designed to receive the lower beveled end of the stakes 4, when the same is dropped downwardly after having been raised to a vertical position. The said socket-plates hold the stakes in vertical position and prevent lateral displacement thereof. To guard against the stakes being jarred from within the socket-plates during travel of the car with its load thereon, a hook 9 engages the lower end of the stake 4 projecting below the socket-plate 7, said hook being attached to the side of the body 1 by means of the chain 10. It will be understood that what may be termed a lock hook 9 is provided for each stake 4.

When the car is not carrying a load, the stakes 4 are thrown into a lowered position so as to lie alongside of the car body, Fig. 2 of the drawings, the said stakes folding inwardly from each side of the center of the car-body. In order that the two inner stakes of the series of stakes may clear each other as lowered or thrown inwardly alongside of the car-body of a flat car, the slot 6 of the said two inner stakes is extended somewhat beyond the slotted portion of the remaining stakes of the series of stakes, so that the said two inner stakes of the series may be slipped outwardly a given distance and thrown inwardly, the outer end of each of the said two inner stakes being inserted within the hanger 11, secured to the sides of the car-body for receiving and supporting the outer end of the said stakes. This permits of the upper end of the said stakes clearing the floor level of the flat car when lowered or placed out of commission, the upper end portion of each of the remaining stakes when lowered resting on the guide sleeve 5 of adjacent stakes.

Ordinarily six stakes are employed for each side of an ordinary freight car, although a greater number of stakes may be utilized, the stakes to each side of the center of the car-body being lowered by turning inwardly, the outer stakes of the series being thus prevented from projecting beyond the ends of the car when the series of stakes are lowered or turned downward.

To place the stakes in vertical position to hold or confine a load for transportation on a car, it is only required that the same be turned on its pivot-bolt into an upright position until the said stake stands at a right angle to the body of the car, the raised stake then being dropped downwardly until its lower end is fitted into the socket-plate 7 so as to hold the stake in its raised or elevated position, the slight downward movement or play of the stake being permitted by reason of the slotted portion or extension 6 thereof through which the pivotal-bolt passes. The stake is guided in its vertical movement as dropped downward into its socket-plate 7 by the guide-sleeve 5 through which it works, the said guide-sleeve, as before stated being held against vertical movement. The stake 4 when thrown into an upright or vertical position and fitted within its socket-plate 7, is held locked therein by means of the hook 9, attached to the side of the car body by the chain 10. While the hook 9 is the simplest form of locking device for holding the stake within its socket-plate, still any suitable form of a locking device may be employed for the purpose.

To release the stake in order that the same may be turned downwardly, the hook or locking device 9 is detached, and the stake 4 lifted from within its socket-plate 7, when the stake is free to be turned on its pivot connection and thrown downwardly alongside of the car-body.

Having thus described the invention, what is claimed as new and desired to be protected by Letters Patent is—

1. The combination with a car body, of a pin extending laterally therefrom, a stake slotted to slide and turn on said pin, a sleeve to slidably hold and guide the stake mounted on the pin at the outer end thereof to turn with the stake and a socket plate below the pin to receive the lower end of the stake to hold the stake in vertical position.

2. The combination with a car body, of a guide sleeve pivoted to the side of said body, a stake slidably held within the guide sleeve to turn therewith, said stake being slotted to slide on the pivot of the guide sleeve and a rigid socket plate rigidly connected to the body at a point below the pivot of the guide sleeve to receive the lower end of the stake and hold the stake in vertical position.

3. The combination with a car body, of a laterally extending pivot pin, a stake slotted for the greater portion of its length to slide and turn on said pin, a socket plate below said pin to receive the lower end of the stake and hold the stake in vertical position, and a socket plate at a substantial distance to one side of the pin to receive and support the lower end of the stake when the stake is in lowered position.

4. The combination with a car-body, of a series of vertically slotted stakes pivoted to each side of the said body and slidable on their pivots, the stakes being arranged to turn inwardly toward the center of the said car-body, the slotted portion of the two inner stakes of each series of stakes being considerably prolonged beyond the slotted portion of the remaining stakes of the series of stakes, of means carried at the sides of the car-body for receiving the lower end of the stakes when in a vertical position and holding the same in such adjusted position, and means carried at the side of the car-body for receiving and supporting the lower end portion of the two inner stakes of the series of stakes when the same are in a lowered position.

In testimony whereof I have signed my name to this specification in the presence of two subscribing witnesses.

WILLIAM H. TEN EYCK.

Witnesses:
N. A. ACKER,
D. B. RICHARDS.